(12) United States Patent  
Stauffer

(10) Patent No.: US 6,513,366 B1  
(45) Date of Patent: Feb. 4, 2003

(54) METHOD AND APPARATUS FOR PACKAGE LEAK TESTING

(75) Inventor: Anton Stauffer, Bedford, NY (US)

(73) Assignee: Packaging Technologies & Inspection LLC, Tuckahoe, NY (US)

( * ) Notice: Subject to any disclaimer, the term of this patent is extended or adjusted under 35 U.S.C. 154(b) by 0 days.

(21) Appl. No.: 09/973,702

(22) Filed: Oct. 11, 2001

(51) Int. Cl.[7] ................................................ G01M 3/34
(52) U.S. Cl. ....................................................... 73/49.3
(58) Field of Search ................................. 73/40.7, 49.3, 73/52

(56) References Cited

U.S. PATENT DOCUMENTS

| | | |
|---|---|---|
| 3,762,212 A | 10/1973 | Morley et al. |
| 4,774,830 A | 10/1988 | Hulsman |
| 4,934,180 A | 6/1990 | Hulsman |
| 5,042,291 A | 8/1991 | Lehmann |
| 5,226,316 A | 7/1993 | Mally et al. |
| 5,513,516 A | 5/1996 | Stauffer |
| 5,939,619 A | 8/1999 | Achter et al. |
| 6,050,133 A | 4/2000 | Achter et al. |

FOREIGN PATENT DOCUMENTS

EP        0445002        2/1991

*Primary Examiner*—Hezron Williams
*Assistant Examiner*—Jay L Politzer
(74) *Attorney, Agent, or Firm*—Dowell & Dowell, P.C.

(57) ABSTRACT

A method and apparatus for testing seals of packages or containers incorporating gas permeable materials wherein the packages are placed between opposing components of a vacuum test chamber such that the seals of the packages are open to a pressure testing system. A flexible bladder backed by a foam material or pressurized fluid seal the gas permeable material afterwhich at least a partial vacuum is drawn to create pressure differential between interior sealed spaces of the packages and the exterior of the package seals. In some embodiments, flexible bladders are provided to initially seal opposite surfaces of packages having opposite gas permeable material covering layers.

21 Claims, 7 Drawing Sheets

METHOD AND APPARATUS FOR PACKAGE LEAK TESTING

BACKGROUND OF THE INVENTION

1. Field of the Invention

The present invention is directed to methods and devices for testing for seal integrity in containers and packages which include flexible or semi-flexible gas permeable materials. More specifically, the invention is directed to testing for leaks in seals of such containers by methods and devices which specifically monitor absolute and differential pressures within a vacuum chamber in which a product package or container is seated during a testing cycle.

2. Brief Description of the Related Art

There is an ever increasing need to ensure for product integrity of packaged goods including sterile medical packages, pharmaceuticals and the like to protect persons the products are used on from possible infection by contaminated products. Often, the type of testing required relates directly to the type of packaging or container in which a product is housed. Testing of products which are packaged in generally non-flexible containers, such as cans, are generally tested by procedures which do not apply to testing of products in flexible containers such as pouches or covered trays.

Over the years there have been numerous innovations made for developing methods and devices for testing the integrity of seals associated with flexible walled packages or trays having flexible closures. Testing procedures have included the use of devices for applying pressure to packages which are carried along a conveyor in which the amount of deflection of the packages, or the amount of recovery, are measured in an effort to determine whether or not leaks are present either in the packaging materials or in the seals associated therewith. Other types of leak testers incorporate vacuum sources wherein packages are placed within chambers and vacuums applied to create differential pressures between the interiors of the packages and the surrounding chambers. Pressures within the testing chambers can be monitored so as to determine if there are changes in pressure after vacuums or partial vacuums are applied to create the pressure differentials and thereby give indications of leaks.

In U.S. Patent 5,513,516 to Stauffer, a method and apparatus for testing of containers is disclosed which incorporates a vacuum chamber in which a flexible or semi-flexible package is cooperatively received. A flexible wall or membrane is provided within the testing chamber and is designed to provide a sealing surface against a flexible wall of a container. Such a device was an improvement over the prior art as the use of the flexible wall or membrane allowed package materials formed of gas permeable materials to be sealed during the testing process.

In the testing of packages which include gas permeable materials, it is important that the gas permeable materials not be allowed to communicate with a vacuum area of a testing chamber, unless pin holes in the Tyvek™ lid have to be detected. The amount of leakage through the gas permeable materials may vary depending upon the exact gas permeable material being used such that consistency of test results can not be verified or compared from one package to another due to the difference in leakage rates through the gas permeable materials when vacuums are drawn to create differential pressures between the interiors and exteriors of the packages under test. In the patent to Stauffer, the flexible wall or membrane is designed to close off the gas permeable material at the initiation of a test procedure such that the membrane is drawn into close proximity with the gas permeable material by the application of a vacuum or partial vacuum thus sealing the material from the remaining portion of the package or container under test.

The application of a vacuum in the area of a package seal results in the flexible membrane compressing the area of the seal with the amount of compression increasing depending upon the vacuum being applied. By regulating the pressure along the seal, with the level of vacuum it becomes a medium by which certain seal defects can be detected more or less, depending on the customer's test criteria.

In U.S. Patent 6,050,133 to Achter et al., a method and apparatus for detecting leaks in packages is disclosed which includes an apparatus and method for testing packages overcoming the aforementioned "claimed" shortcomings. In this patent, a temporary barrier is applied to the gas permeable portion of the sealed package with the exception of a small aperture area through which a tracer gas may be supplied through the gas permeable portion and into the interior of the package. The temporary barrier is formed of an adhesive backed material which is applied to the gas permeable material to seal the material. By measuring the concentration of tracer gas outside of the seal of a package within a test chamber, it is possible to determine whether or not a leak exists in the seal of the package or container.

Unfortunately, this type of testing apparatus and method is a very tedious and slow procedure requiring application of an adhesive material to seal the gas permeable material of the package. Not only must the adhesive layer be applied, it must also be removed after the package has been tested. This is labor intensive and time consuming. Also, the adhesive material can adversely effect printing on the package or may even result in failure of a portion of the package including the gas permeable layer or the seal layer upon the removal of the adhesive covering material from the package.

One of the essential features of any testing method and apparatus is that it must be economical to the manufacturer to use so that cost of products are not increased due to slow testing procedures. When it becomes necessary to apply adhesive coverings to packages to be tested, the amount of time required for a test is increased significantly and, therefore, such procedures are not well suited for mass commercial uses wherein continuous testing of package products must be accomplished in an expeditious manner under very high speed packaging conditions.

In view of the foregoing, there remains a need to provide an apparatus and procedures for testing packages which incorporate gas permeable materials in order to ensure that the seals associated with such packages are intact and do not contain leaks which can effect the quality of the product contained within the packages but wherein such tests can be done expeditiously so as not to adversely effect the overall economics of the packaging procedures.

SUMMARY OF THE INVENTION

The present invention is directed to a method and apparatus for leak testing of packages and containers which include at least one surface layer formed of a gas permeable material such that gas is allowed to pass into and out of an interior space of the packages. The apparatus includes a vacuum testing chamber formed by opposing tool components one of which normally would form a bottom component and the other a top component, however, different orientations may be possible and yet remain within the teachings of the invention. The two components form therebetween a testing chamber in which a package to be tested is inserted such that the edges thereof which are sealed extend outwardly of the chamber between flanges of the opposing tools.

In a first embodiment, a package such as a tray or other container having one or more product containing pockets which are sealed by one or more gas permeable materials is initially positioned within one of the opposing tools with the seals surrounding the tray extending outwardly along the flanges of the opposing tools. A flexible bladder, preferably formed of a soft silicon rubber type material, but not limited thereto, is placed in overlying relationship with respect to the gas permeable material and extends outwardly, in some embodiments, beyond seals which are provided between the flanges of the opposing tools forming the test cavity. The seals associated with the test cavity are positioned exteriorly or outwardly beyond the seals of the package under test. In a preferred embodiment of the invention, a foam material, which is contoured to the outer contour of the package as it is initially formed, is provided along the opposite surface of the flexible bladder and is pressed against the bladder. The foam presses the bladder against the gas permeable material in such a manner as to not compress the material but to ensure that the gas permeable material is sealed by the flexible bladder and in such a manner that the seal of the package under test is not effected by the placement of the bladder in sealing relationship with respect to the gas permeable layer of the package.

The foam may be carried by a movable tool member of the test cavity such that the foam and bladder are applied to the package at the time the vacuum chamber is closed.

A pressure testing system such as that disclosed in U.S. Pat. No. 5,513,516 communicates with an evacuation area surrounding the seal between the gas permeable material and the tray of the package. The evacuation area includes an area surrounding the package such that the seal is in open communication with a channel through which gas may pass to the pressure testing system to thereby provide a determination of pressure differential or absolute pressure measurements which can be used to determine whether or not a leak exists in the seal of the package under test.

During a test, a source of vacuum is connected with the gas channel from the test chamber such that at least a partial vacuum may be applied in the area of the seals of the package under test to thereby create a differential pressure between the pressure within the interior of the package and the pressure surrounding the seal. Should a leak exist, gas will pass through the seal and can be detected by changes in pressure being monitored once the at least a partial vacuum has been applied.

From the foregoing, the tools forming the test chamber provide a seal exteriorly of the seal of the package with the area of communication to the test system being created intermediate such seals. In this manner, the exterior seals can be constructed so as to ensure that there is no gas leakage therebetween without any adverse compressive forces applied to the seal of a package under test.

In some embodiments, the foam material which backs the flexible bladder will extend outwardly above at least a portion of the seal of the package. In this manner, there will be less tendency of the reduced pressure within the area surrounding the seal of the package under test causing the flexible bladder to further compress the package seal.

In another embodiment of the invention, packages which include opposing gas permeable layers, such as flexible pouches, are tested in a test chamber having a pair of opposing flexible bladders or membranes which are each backed by a foam material contoured to match the contour of the package prior to test. In this embodiment, the edges of the package defining the seal(s) are situated between generally fixed flanged areas of the opposing tools of the test cavity. A package placed in the test chamber is retained by the closure of the tool components relative to one another with the foam layers ensuring that the opposing flexible bladders seal off the gas permeable layers of the packaging material before any vacuum is applied to the area surrounding the seals of the package under test. The method of testing incorporates the same pressure monitoring system as previously described.

In the preferred embodiments described, the foam material is a somewhat flexible or soft foam material, however, the resilience of the foam material may vary, being somewhat more flexible towards the center and more rigid towards the side edges of the package under test.

In alternative embodiments of the invention, as opposed to using the foam material for backing the flexible bladders or membranes, a positive pressure may be applied by introducing a gas, liquid or other fluid into the area behind the bladders and causing the bladders to thus conform to the outer configuration of the package under test before a vacuum or partial vacuum is applied to the areas of the seal associated with the package. In this manner, forces are applied to conform the flexible bladders to the original configuration of the outer gas permeable walls of the package under test using a fluid as opposed to a solid.

In a further embodiment of the invention, adjustable seals may be associated with the test apparatus. Such seals include inflatable bladders or other materials for increasing the pressure compressing the seals of the package under test. Under such conditions, it is necessary to determine a relationship between the amount of pressure applied at the area of the seal and degree of leakage being measured by the pressure testing or sensing system of the invention, as increased pressure at the seals would reduce the amount of leakage detected by the test system.

The apparatus and systems of the present invention may also be utilized to test the integrity of the materials which form the packages and containers being tested and particularly for testing the gas permeable materials associated with such packages. In some instances, small pin-type holes may exist in such packaging layers which openings can be detrimental to the integrity of the packages and the sterility of the contents thereof. In this respect, the flexible bladders used with the various embodiments of the invention may be provided with a contoured or roughen lower surface which engages the gas permeable material of the packages or containers during testing. Such roughened or contoured surfaces provide a plurality of vent areas by way of which gas can pass to the cavity or chamber under a vacuum test. By monitoring the pressures an immediate indication of holes in the gas permeable material may be easily detected when compared with predetermined pressures associated with known gas permeable materials.

It is the primary object of the present invention to provide a method and apparatus for accurately testing for leaks in seals of packaging which incorporate gas permeable layers, either in a tray type form having a gas permeable cover or in a pouch type form wherein opposing gas permeable layers are sealed at their edges to one another, to ensure that product integrity is maintained and that any material retained within the package is safe for its intended use.

It is also an object of the invention to provide a method and apparatus for testing packaging to ensure integrity of seals wherein the system allows for substantially continuous testing of products such that a products under test can be tested within a matter of one to three seconds without requiring any modification to the package to initiate the tests as is the case with some prior art methods and devices for integrity testing of seals.

It is yet another object of the invention to provide a method and apparatus for testing gas permeable flexible wall containers wherein pressure decay technology is utilized to determine leaks without requiring the injection of costly tracer gases into packaged products.

It is also an object of the invention to provided method and apparatus for testing gas permeable flexible wall containers wherein the integrity of the gas permeable material may also be tested to ensure that no adversely large openings or holes exist therein which could comprise the sterility of contents of the containers.

BRIEF DESCRIPTION OF THE DRAWINGS

A better understanding of the invention will be had with respect to the accompanying drawings wherein.

DESCRIPTION OF THE PREFERRED EMBODIMENTS

Figure 1:
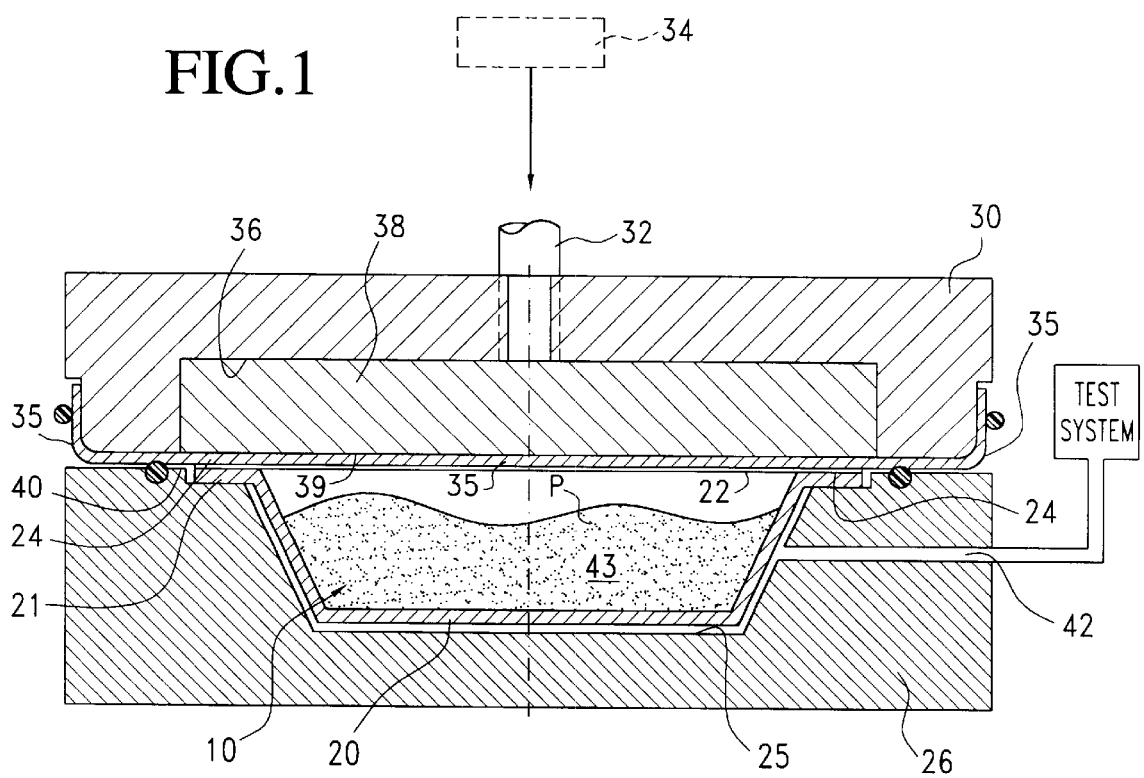
FIG. 1 is a cross-sectional illustrational view showing a first embodiment of the invention in which a Tyvek™ tray is shown under test.

With continued reference to the drawing figures, the invention is for use in testing leaks in packaging having one or more covering layers of a gas permeable material. In FIG. 1 a package 10 includes a tray 20 which is formed of a material which is non-permeable to gas contains a product "P". The tray includes an upper outwardly directed flange 21 and is covered by a gas permeable material layer 22 which is sealed at the interface between the outer edges thereof and the flange 21 by a seal 24 which may be formed of an adhesive material, fusion bonding of the material layers, or in some other manner to form the package. The gas permeable layer 22 is provided to allow oxygen or other gas to pass therethrough to the product contained within the tray. Such containers are referred to in the industry as Tyvek™ containers.

To ensure the integrity of the seal 24 between the gas permeable layer 22 and the flange 21 of the package 10, the tray 20 is placed within a conforming cavity 25 formed in a tool component 26 of a vacuum chamber 28. Tool component 26 will be described as a bottom tool, however, in some embodiments, different orientations may be possible and be within the teachings of the invention.

The bottom tool 26 is opposed by an upper tool component 30 which is carried by a ram 32 associated with a control member generally shown in outline at 34 which moves the upper tool 30 relative to the lower tool. The upper tool component includes a recessed area 36 therein in which is seated a foam material 38. The foam is mounted behind a flexible non-gas permeable membrane 35 which is secured across a lower face of the upper tool component 30. The membrane may be, for example, a pliable rubber material. It is preferred that the foam material generally extend outwardly within the recess 36 so as to fully cover and press the membrane 35 to seal against the gas permeable layer 22 of the package 10 when the tool components are closed relative to one another to define the vacuum chamber therebetween. In this manner, the gas permeable layer 22 is sealed such that no gas can pass therethrough. The foam material is preferably a soft foam, such as a soft silicon base rubber material. However, in some embodiments, the density of the material may change with a harder foam being applied on the edges of the material than at the center portion such that the softer and more resilient foam is provided above the central area 24 of the package.

A front surface 39 of the foam material is generally of a configuration compatible to the configuration of the gas permeable layer 22, which in the embodiment shown at FIG. 1 is generally planar, such that any residual slack and surface air is removed, and limited pressure is placed by the membrane 35 on the gas permeable layer 22 forcing it into the package when the vacuum chamber is closed. Thus the internal volume of the package should not change when a vacuum is applied to the cavity 25 adjacent the seal 24 of the package by way of a vacuum passageway 42 provided in the lower tool part 26. In some embodiments, channels may be provided as grooves or raised portions for supporting the package within the cavity 25 such that the vacuum is applied directly at the interface or seal 24 between the upper gas permeable layer 22 and the flanges 21 of the tray 20. In this manner, when a vacuum is applied, a pressure differential is created in the area of the seal between an internal space 43 within the container or package and the cavity 25 surrounding the seal 24.

As shown in drawing FIG. 1, a mechanical seal such as a gasket or o-ring 44 may be provided for sealing the area between the flanges of the opposing tool components of the test cavity and which is spaced outwardly relative to the seal 24 between the gas permeable layer 22 and the tray 20 of the package under test.

Using the methodology of the present embodiment of the invention, once the package is placed within the cavity 25, the upper tool component 30 is lowered such that the flexible membrane 35 initially seals the gas permeable layer 22 of the package thus preventing gas exchange to or from the internal space 43. During this time, the upper tool 30 is sealed relative to the lower tool 26 by the gasket or o-ring 44 such that the cavity 25 communicates with the passageway 42 so that a pressure test can be performed on the seal 24.

Figure 9:
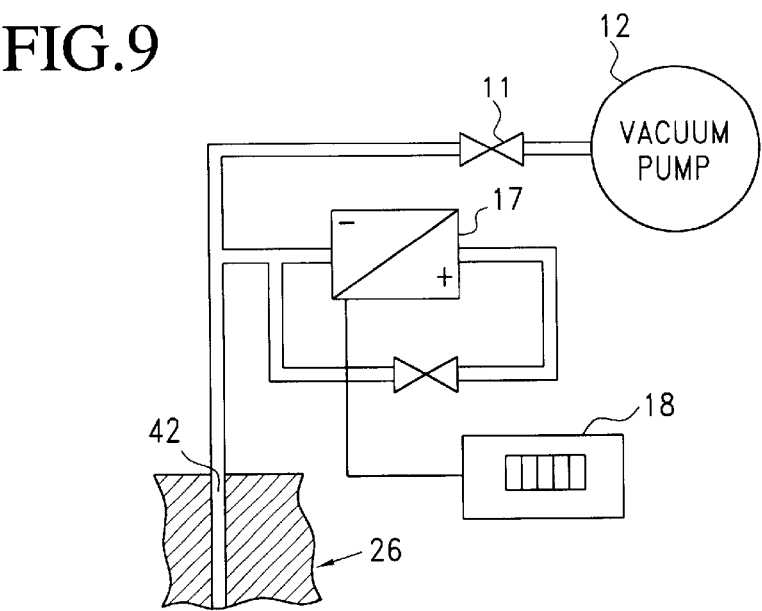
FIG. 9 is a differential pressure testing circuit diagram of the invention.

With reference to FIG. 9, during the pressure test, a vacuum or partial vacuum is applied to the cavity 25 through passageway or channel 42 and valve 11 by a vacuum pump 12 as is taught in U.S. Pat. No. 5,513,516, the contents of which are incorporated herein by reference. Once an appropriate vacuum or partial vacuum has been applied to establish a differential pressure between the interior of the internal space 43 of the package and pressure in the cavity 25, either an absolute or differential pressure test is performed to make a determination of whether or not there is any leakage of gas through the seal 24.

Figure 10:
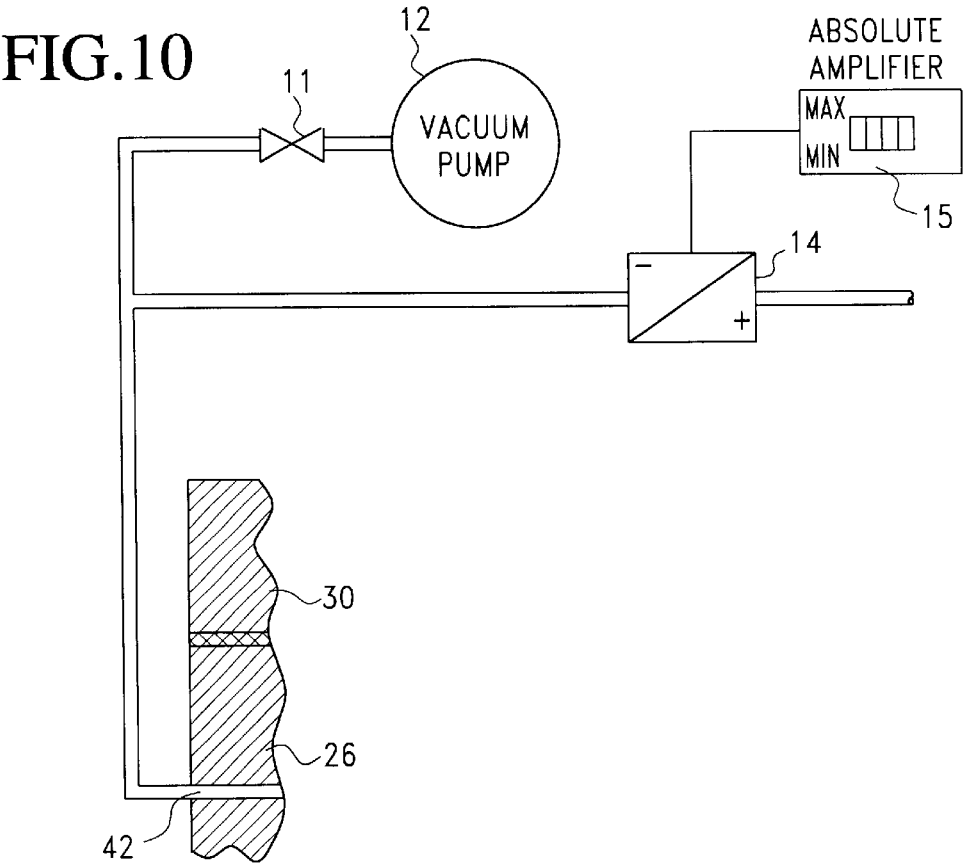
FIG. 10 is an absolute pressure testing circuit diagram of the invention.
Figure 11:
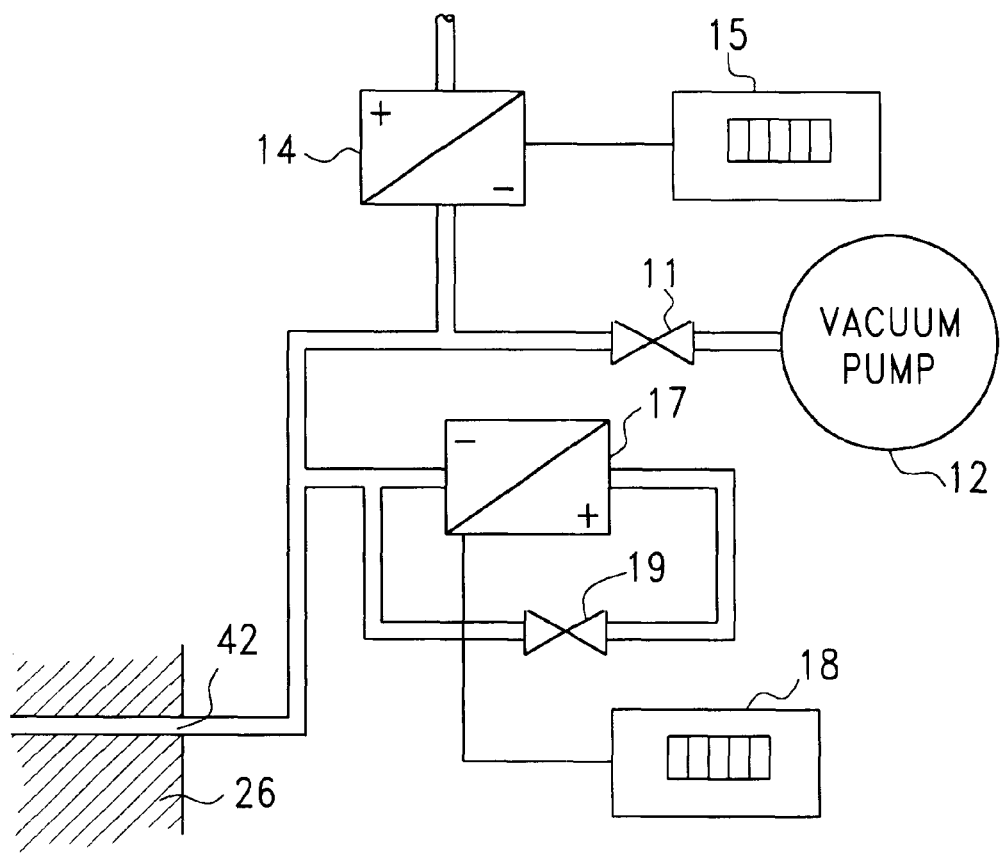
FIG. 11 is a combination absolute and differential testing circuit according to the invention.

After a period of stabilization following the depressurization of the enclosed space or cavity 25 of the test chamber, a valve 19 is closed to initiate a predetermined timing cycle for measuring a change in pressure within the cavity 25. The pressure in the enclosed space is measured by means of pressure transducer systems as shown in FIGS. 9 to 11. As shown in FIG. 9, pressure is measured by use of differential pressure transducer 17 and amplifier 18. If the measured vacuum falls below a specified level or the vacuum decreases (pressure increases) more than a predetermined amount, the package is determined to have a leak. The pressure is measured dynamically by detecting the change of pressure in the enclosed space over time. As opposed to measuring the pressure over time, an absolute pressure may be measured by connecting channel 42 to a transducer 14 and an absolute amplifier 15, see FIG. 10. The absolute measurement is not as accurate as the differential measurement and is principally used for the detection of large defects, whereas the differential vacuum is used to detect minor defects.

As shown in FIG. 11, the test system may include both the transducers and amplifiers of the dynamic and the absolute systems in fluid communication with the vacuum pump 12 and valve 11.

Figure 2:
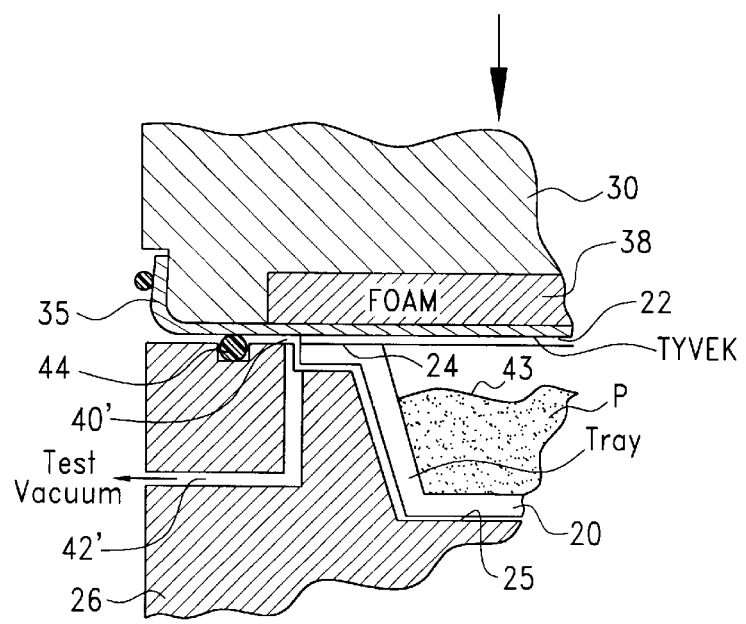
FIG. 2 is an enlarged partial cross-sectional view of a variation of the embodiment shown in FIG. 1.

With particular reference to FIG. 2, a slight variation of the embodiment of FIG. 1 is shown wherein the foam material 38 extends across only a portion of the seal area 24 between the upper gas permeable layer 22 and the flange 21 of the tray 20 with the tool 30 extending across the remaining portion of the seal 24. In this embodiment, the test vacuum pressures are applied through the passageway 42' to the cavity 25 adjacent to the seal 24. In this embodiment, when the internal vacuum is applied, membrane 35 will place a greater force along the outer portion of the seal area 24.

Figure 3:
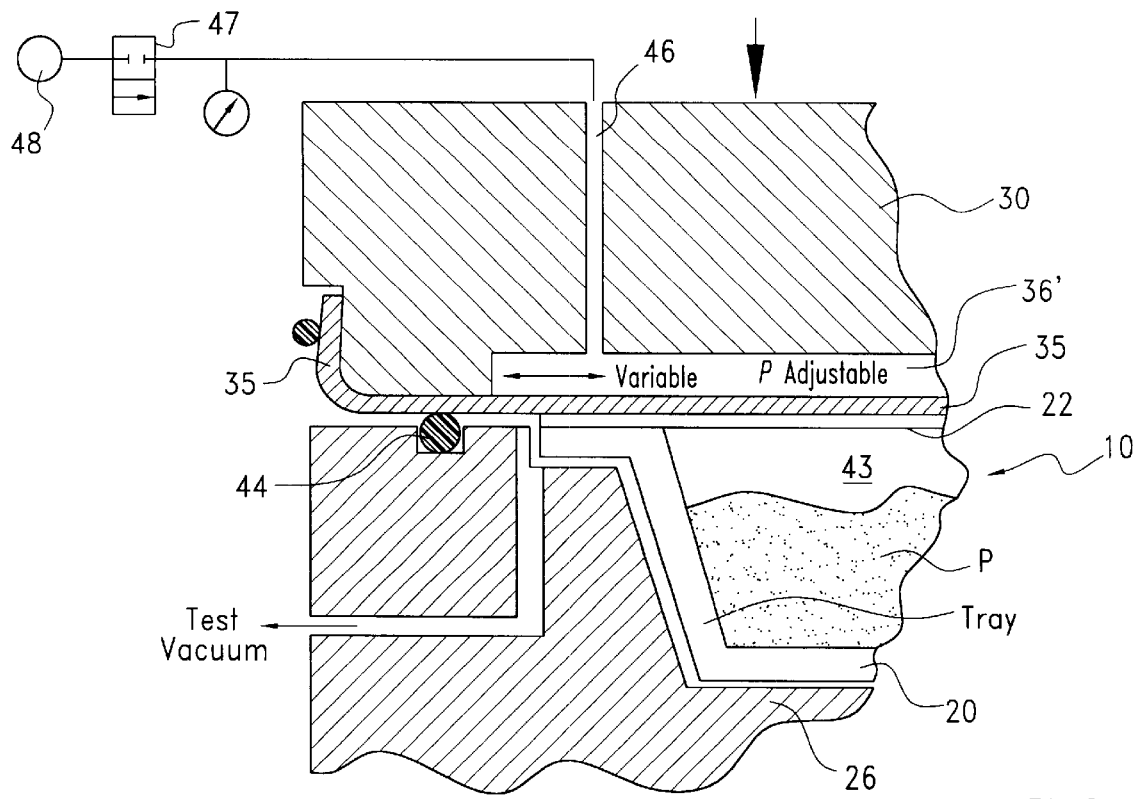
FIG. 3 is an enlarged partial cross-sectional view similar to FIG. 2 but showing the use of fluid pressure as opposed to the use of a foam backing member in accordance with the teachings of the invention.

With specific reference to FIG. 3, another variation of the first embodiment of the invention is disclosed. In this embodiment, as opposed to providing a foam material 38 in backing relationship with respect to the flexible bladder 35, positive air pressure is used in a the recessed area 36' adjacent to the flexible bladder. A channel 46 is provided through the upper tool part 30 which communicates through a valve 47 with a source fluid under pressure 48, such as a pump, so that a controlled amount of pressure may be introduced into the area 36' to provide sufficient force to engage the bladder across the gas permeable layer 22 without forcing the material into the internal volume or space 43 of the tray.

As shown in drawing FIG. 3, the size of the recess 36' may be varied and the recess may extend over the entire seal area 24 or only partially across the seal area 24 in a manner as discussed with respect to the foam material of FIG. 2.

Figure 4:
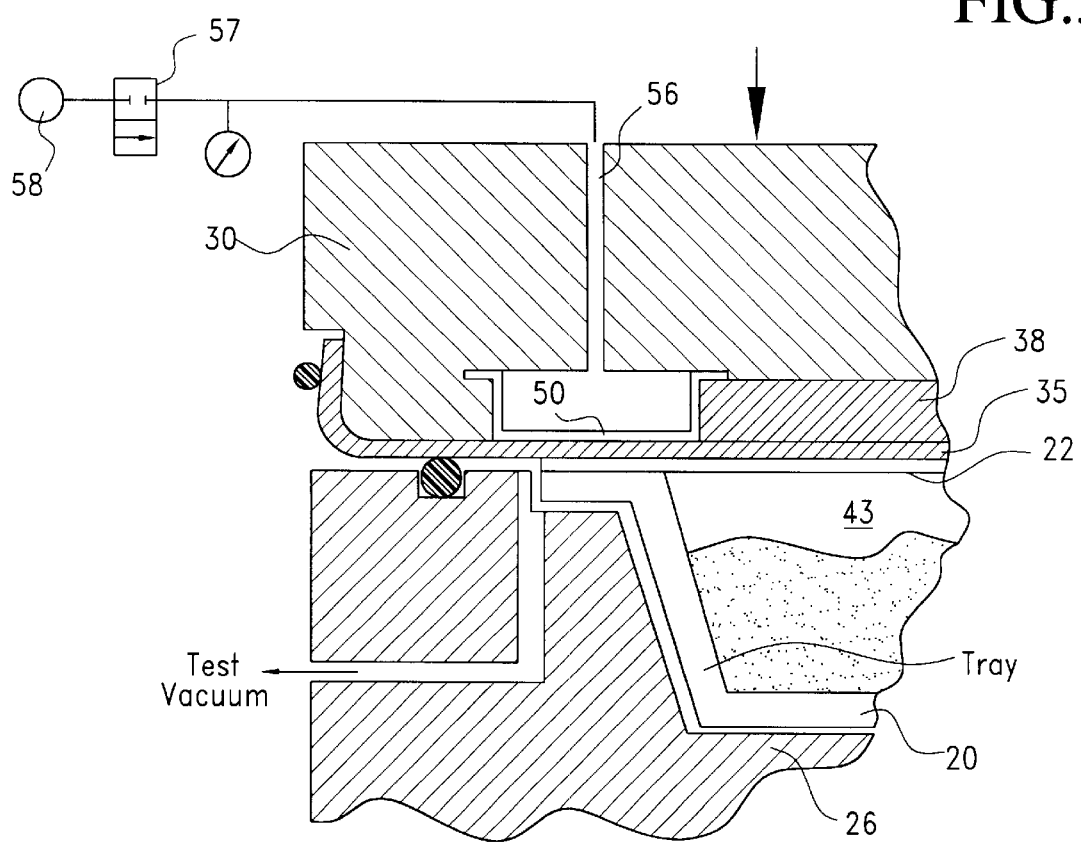
FIG. 4 is an enlarged partial cross-sectional view similar to FIG. 2 showing a variation incorporating a controllable blow-up seal.

With specific reference to FIG. 4, a further modification of the first embodiment of the invention is disclosed wherein the foam material is shown as being applied to the flexible membrane 35. However, in this embodiment, an inflatable gasket 50 is provided over the area of the package seal 24. Positive pressure is applied through a passageway 56 connected to a valve 57 downstream of a source of pressure or pump 58. By supplying regulated pressure to the inflatable gasket 50, a force on the seal 24 can be regulated. The amount of force can be communicated to controls associated with the pressure testing system to thereby effectively monitor leakage of any gas from the internal portion of the tray depending upon the pressure applied at the seal 24.

With particular reference to FIGS. 5–8 a second embodiment of the invention is disclosed in greater detail which is particularly designed for testing of flexible pouches 60 having oppositely oriented or opposing gas permeable material layers 61 and 62, respectively, which are sealed at their edges as shown at 63 either by an adhesive, conductive and sonic welding or the like. In this embodiment, as the pouch is formed with two gas permeable layers, it is necessary to ensure that there is no gas passing through either gas permeable layer when a test of the seal 63 is performed by creating a vacuum or partial vacuum at an area 70 adjacent to the seal. The area 70 is connected by fluid passageway 72 to the test system of the invention. In this embodiment, the test cavity includes a vacuum chamber 75 having a lower or bottom tool part 76 and an upper tool part 77. Tool part 76 has a cavity 78 formed therein and the upper tool part 77 has a cavity 79 formed therein. Each of the cavities 78 and 79 house generally soft foam materials, as previously described, shown at 80 and 81, respectively, having inner surface contours 82 and 83 which match the configuration of the outer surface of the pouch when in its normal position before any testing vacuum is applied relative thereto. The purpose of the foam is to provide a sealing pressure to a pair of opposing bladders 85 and 86 made of the same material as described with respect to the embodiment of FIG. 1. The bladders seat against and seal the gas permeable layers 62 and 61 to prevent fluid flow therethrough during the testing procedure. Further, the configuration is such as not to force the gas permeable layers 61 and 62 inwardly of an inner space 90 of the pouch.

Once the bladders have been sealed by movement of the upper tool part 77 relative to the lower tool part 76, which movement also seals the tool parts with respect to the upper diaphragm 86, as shown at 91, the test procedure can be performed. By providing differential pressure between the interior space 90 and the space or area 70 between the seal 63 of the upper and lower layers 61 and 62 of the pouch, a determination can be made over time as to any changes in pressure following the application of the vacuum or partial vacuum in the area 70.

Figure 5:
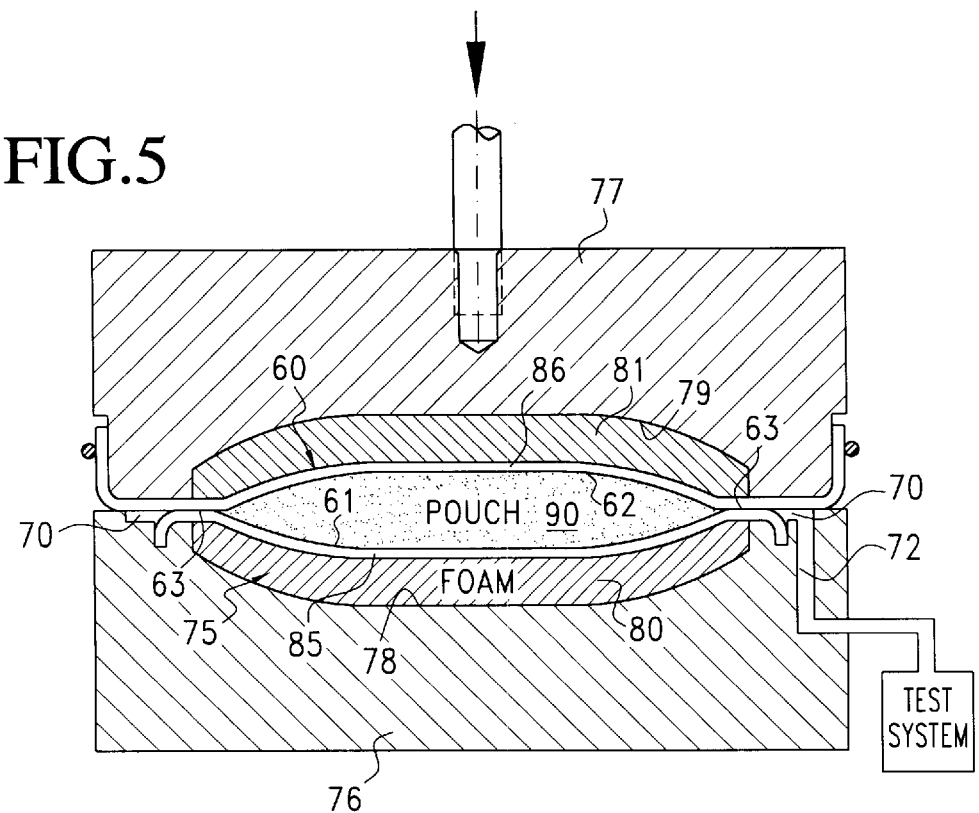
FIG. 5 is a cross-sectional view of a second embodiment of the present invention showing a flexible pouch having opposing gas permeable sidewalls being tested in accordance with the teachings of the invention.
Figure 6:
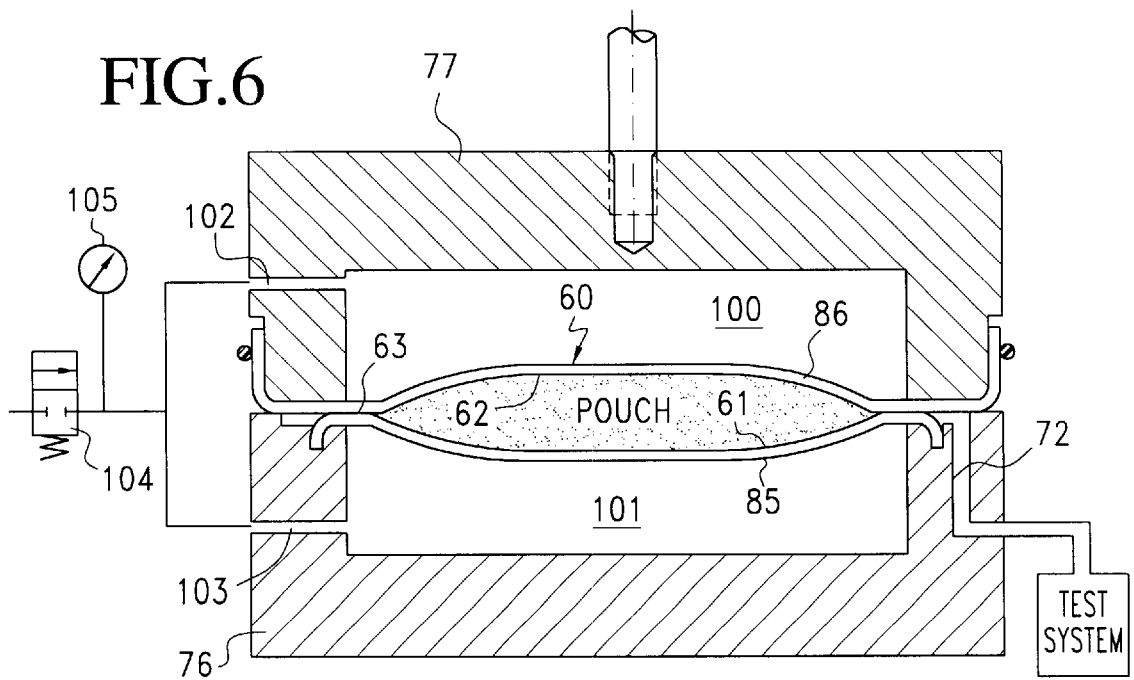
FIG. 6 is a modification of the embodiment of FIG. 5 shown in cross-sectional view wherein fluid pressure is used as opposed to foam for backing the flexible membranes of the invention.

With specific reference to FIG. 6, a variation of the embodiment of FIG. 5 is shown in which the foam backing materials 80 and 81 have been replaced by pressure chambers 100 and 101 which are positioned on opposite sides of the gas permeable layers 62 and 61, respectively. A pair of channels 102 and 103 communicate with a valve 104 connected to a source of fluid pressure 105 such that pressurized fluid can be introduced into the chambers 100 and 101 to provide pressure to force the bladders 85 and 86 into sealed engagement with the gas permeable layers 62 and 61 of the pouch. Again, the fluid pressure is only sufficient to provide a sealing contact and not to deform the gas permeable layers 62 and 61 of the pouch. After the appropriate pressure is applied, a test can be made with respect to a leak of the seal area 63 of the pouch by initially applying a vacuum or partial vacuum in the area 70 surrounding the seal and thereafter monitoring changes in pressure within those areas.

Figure 7:
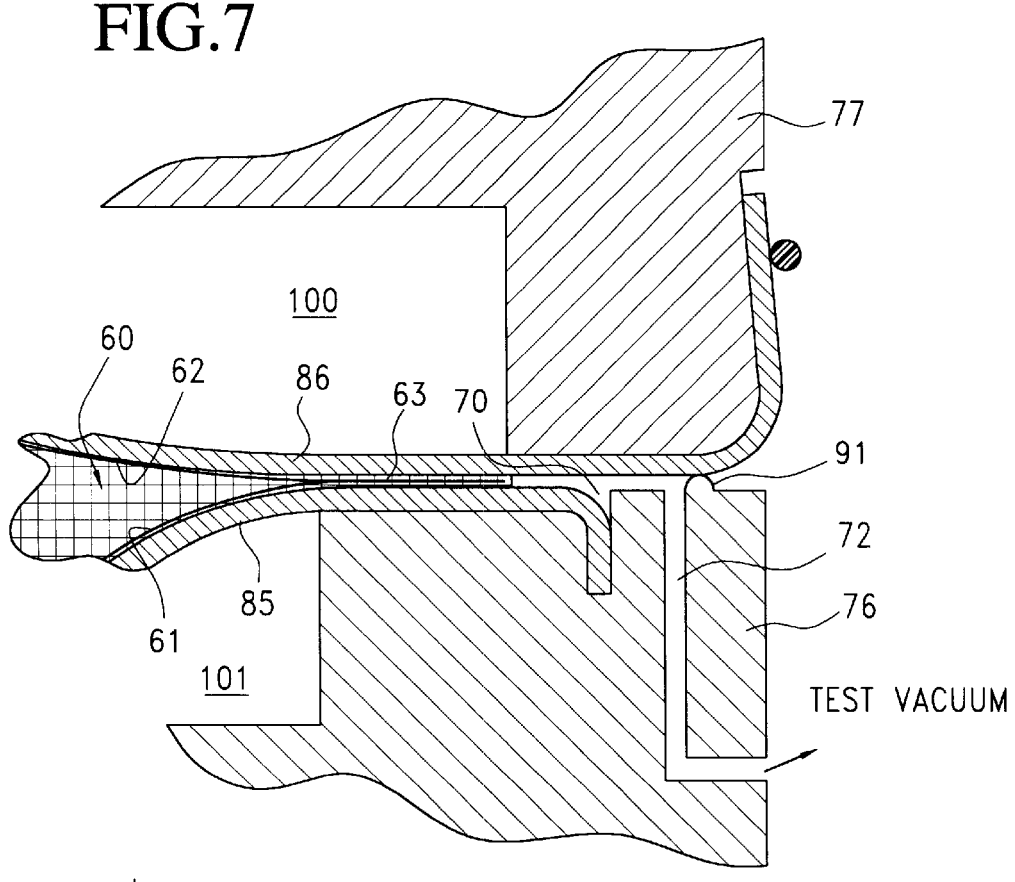
FIG. 7 is an enlarged partial cross-sectional view of the embodiment shown in FIG. 6 showing the seal area of the pouch under test.
Figure 8:
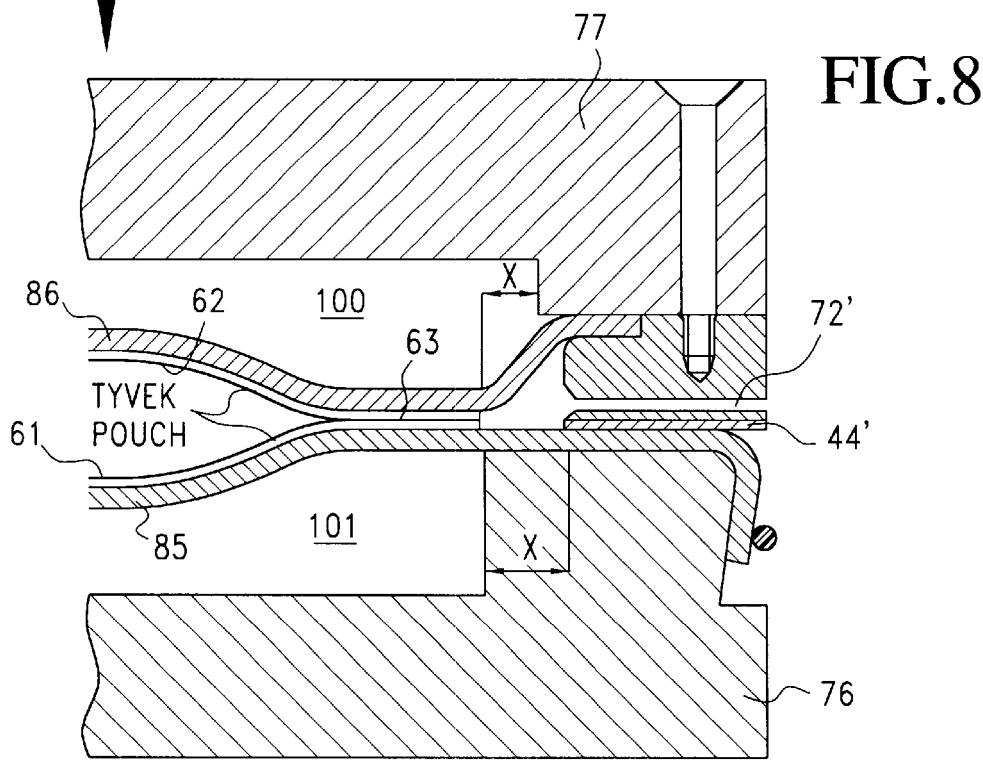
FIG. 8 is an enlarged cross-sectional view showing another variant of the embodiment of FIG. 6.

With respect to FIG. 7, a slight variation of the previous embodiment is shown. In this embodiment, instead of communicating the area 70 adjacent to the seal 63 through the lower tool part, the evacuation channel 72' is provided through the upper tool part. Also, as shown in this drawing figure, in some embodiments, a variation of the gasket material 49' may be applied between the tool parts exteriorly of the seal area 63 between the gas permeable layers of the pouch.

Although not shown in the drawing figures, the seal area 70 of this embodiment of the invention may also include blow-up seals or gaskets which can be monitored to determine the amount of pressure being applied to the seal 63 which pressure is supplied to the system to compute changes in pressure caused by the application of the vacuum in the area 70 adjacent to the seal 63 by the test system of the invention.

Figure 12:
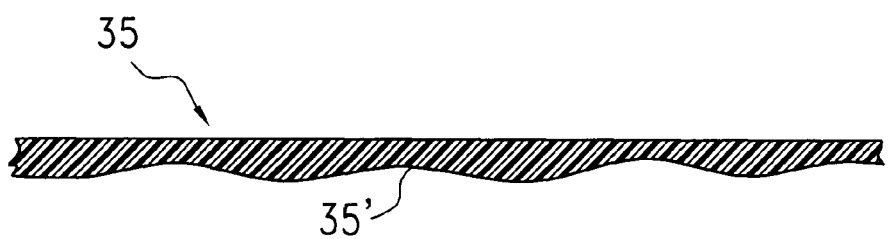
FIG. 12 is a partial cross sectional view of a modified bladder of the invention.

With particular reference to FIGS. 1 and 12, the method and apparatus of the present invention may be utilized to test for holes or leaks in the gas permeable layer 22 of the Tyvek™ containers or packages. If holes exist or are created in the gas permeable layer, it is possible the contents of the containers can become unsterilized and, thus, it is necessary, in some instances, to ensure the integrity of the gas permeable covering materials.

To test for leaks in the gas permeable material, a testing apparatus such as shown in FIG. 1 is used with the exception that a modified membrane or bladder is used to seal against the gas permeable layer of the package. As shown in FIG. 12, the modified membrane 35A includes a contoured or roughened lower surface 35A' which creates a plurality of small channels through which gas can flow to the cavity 25 when a package is placed under a vacuum during a test procedure. The membrane is formed of the same material as the membrane 35 disclosed with respect to the embodiment previously described with respect to FIG. 1. If a container has been previously tested utilizing the membrane 35 disclosed with respect to the embodiment of FIG. 1, the absolute pressure which was measured may be compared with the absolute pressure determined utilizing the contoured or roughened membrane 35A to provide an immediate indication that a leak or hole exists in the gas permeable layer 22. Further, a pressure change for a fully functional gas permeable layer 22 can be determined and thus compared to any test results obtained utilizing the specialized membrane.

Figure 13:
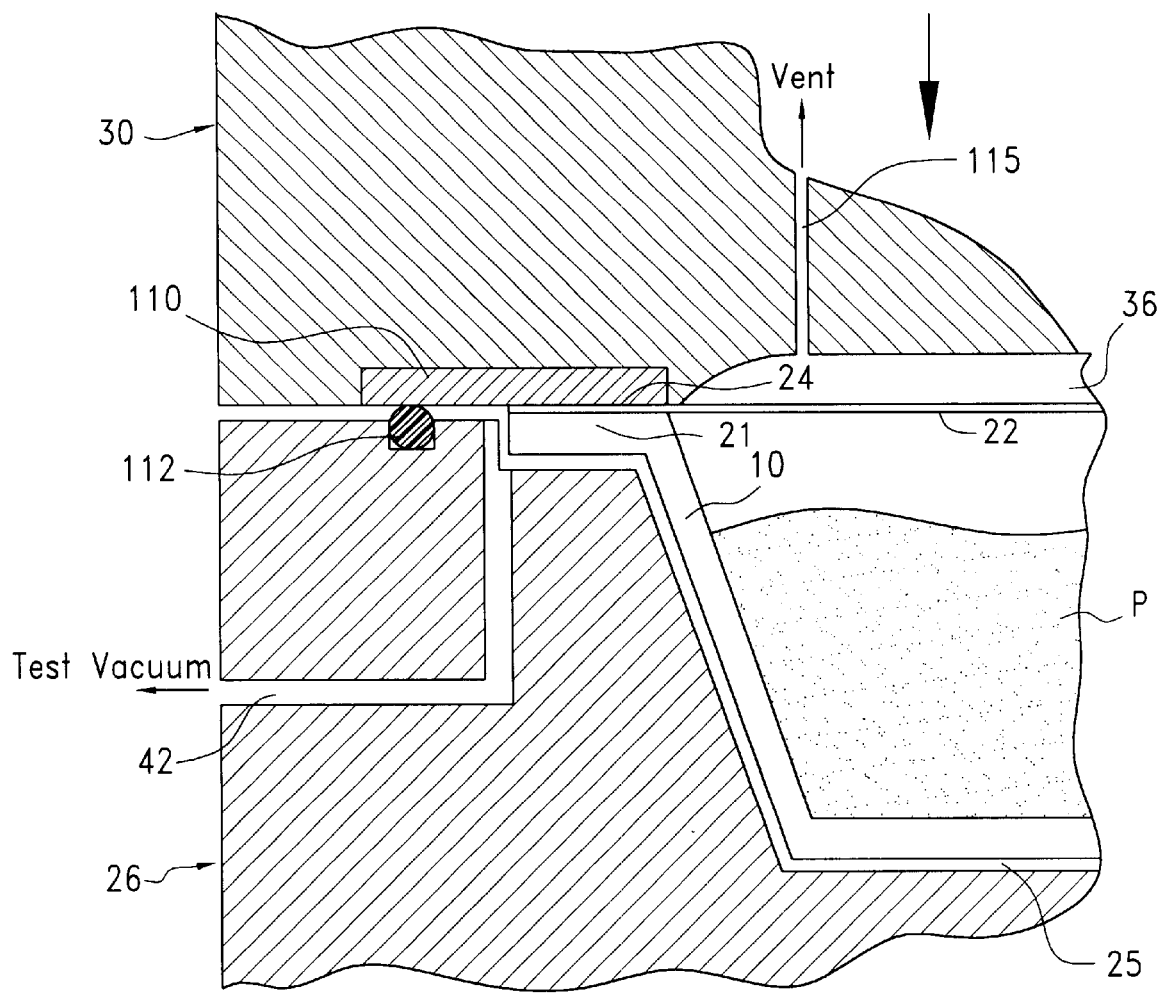
FIG. 13 is a partial cross sectional view of an embodiment of the invention for testing for leaks in gas permeable cover layers of packaging being tested in accordance with the invention.

With particular reference to FIG. 13, another apparatus and method for determining the proper integrity of the gas permeable layers 22 of packages 10 is disclosed. In this embodiment the tool or test chamber is the same as disclosed with respect to the embodiment disclosed in FIG. 1 with the exception that there is no membrane nor foam material utilized in the cavity to seal the upper surface 22 of the container 10. The testing chamber is thus defined by an upper tool component 30 and a lower tool component 26. A test cavity 25 is provided within the lower tool component 26 which communicates to a testing system by way of an exhaust channel 42. The upper tool component includes a recessed area 36, however, no foam material is seated within the recess.

In the present embodiment, the package seal 24 extending along the flange 21 of the package tray 10 is sealed by an overlying gasket 110. The interface between the tool components 30 and 26 is further sealed by use of a packing material or o-ring 112 which extends around the full perimeter of the container or tray. With the tool components closed relative to one another and a package seated within the cavity 25, a vacuum is applied to the recess area 36 of the upper tool component 30 by way of a vent 115 connected to an appropriate vacuum pump such as the pump 12 associated with the testing systems previously described.

With this embodiment, the gasket 110 seals the flange area of the package and allows a vacuum to be applied through channel 115 to the recess area 36. Any pin hole or irregular opening will cause an evacuation of air from the package at a faster rate than determined with respect to packages or containers which are properly sealed with no damaged gas permeable cover layers 22.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A method for detecting a leak in a seal of a package or container having a gas permeable material surface area at least partially covering an interior sealed space, the method including; placing the package to be tested within a vacuum test chamber defined between first and second opposing tool components which define the chamber therebetween, applying a sealing force to seal the package within the chamber, applying a flexible bladder over a gas permeable material surface area covering the interior sealed space, applying a backing force to retain the flexible bladder against the gas permeable material surface area to thereby prevent gas flow through the covered gas permeable material, creating at least a partial vacuum to an exterior area open to the package seal to create a pressure differential between an exterior portion of the package seal and the interior sealed space, and monitoring pressure in the exterior area open to the package seal after the applied partial vacuum to determine if a leak exists in the package seal.

2. The method of claim 1 in which the application of the backing force to prevent gas flow between the flexible bladder and the gas permeable material surface area is applied by a foam material carried by the first tool component of a size to ensure the flexible bladder completely seals the gas permeable material surface area.

3. The method of claim 2 including mounting the flexible bladder in overlaying relationship to the foam material to the first tool component.

4. The method of claim 3 wherein the foam material extends over at least a portion the package seal.

5. The method of claim 3 including regulating a force within the chamber applied against the package seal.

6. The method of claim 1 wherein the package is a pouch having opposite gas permeable material surface areas covering the interior sealed space, applying a flexible bladder over each of the gas permeable material surface areas, applying a backing force to urge each of the flexible bladders against the opposite gas permeable surface areas to thereby prevent gas flow through the opposite covered gas permeable material surface areas, and thereafter applying the at least partial vacuum and monitoring pressure.

7. The method of claim 6 in which the application of backing force to prevent gas flow between the flexible bladders and the opposite gas permeable material surface areas is applied by a foam material carried by each of said first and second tool components, and each foam material being of a size to ensure the flexible bladders completely seal the opposite gas permeable material surface areas.

8. The method of claim 7 including mounting the flexible bladders in overlaying relationship to the foam materials to each of the first and second tool components.

9. The method of claim 1 in which the application of backing force to prevent gas flow between the flexible bladder and the gas permeable surface area is supplied by introducing a fluid under pressure into a recess of the first tool component to supply pressure against the surface of the flexible bladder opposite the surface which abuts the gas permeable material surface area.

10. The method of claim 1 wherein the package is a pouch having opposite gas permeable material surface areas covering the interior sealed space, applying a flexible bladder over each of the gas permeable material surface areas, applying a backing force to the flexible bladders wherein the backing force is supplied by introducing a fluid under pressure into the recess formed in each of the first and second tool components to thereof supply pressure against the flexible bladders to urge each of the flexible bladders against the opposite gas permeable surface areas and thereby prevent gas flow through the covered gas permeable material surface areas, and thereafter applying the at least partial vacuum and monitoring pressure.

11. The method of claim 10 including regulating a sealing force applied to the package seal within the chamber.

12. The method of claim 1 in which the package is a tray having at least one gas permeable material surface area bordered by a seal, placing the tray within a cavity of the second opposing tool components so as to define gas passages therebetween, and thereafter applying the flexible bladder over the gas permeable material surface area.

13. A method for detecting an inappropriate leak in a gas permeable material associated with a sealed package, the method including, placing the package within a vacuum test chamber defined between first and second opposing tool components, applying a flexible bladder having a surface defining air flow passages with such surface being disposed over a gas permeable material surface area of the package, creating at least a partial vacuum within the test chamber to create a pressure differential between an interior of the package and the test chamber and monitoring change in pressure in the test chamber to determine if an inappropriate leak exists in the gas permeable material.

14. An apparatus for testing for a leak in a seal of a package or container having a gas permeable material surface area at least partially covering an interior sealed space, the apparatus including; a vacuum test chamber of the size to cooperatively receive a package therein defined by opposing first and second tool components having opposing peripheral edges, at least one flexible bladder extending between the opposing tool components of a size to completely cover the gas permeable surface area, means for urging the flexible bladder to seal against the permeable surface area to prevent gas flow therethrough, means for creating at least a partial vacuum within the test chamber so as to create a pressure differential between the interior space of the package and an area exterior of the seal of the package mounted within the test chamber, and means for monitoring the pressure within the vacuum chamber following the application of at least a partial vacuum.

15. The apparatus of claim 14 in which said means for urging the flexible bladder against the gas permeable surface area includes a foam material mounted within a cavity formed in the first of the tool components, said foam material having a surface engageable with the flexible bladder which conforms to the surface of a package to be tested prior to testing.

16. The apparatus of claim 15 in which the foam material is formed of a soft rubber material.

17. The apparatus of claim 14 including a pair of flexible bladders mounted in opposing relationship with respect to one another, one of said opposing flexible bladders being mounted to the first tool component and the other being mounted to the second tool component, and means for sealing the tool components exteriorly with respect to the interior area relative to the package seal to be tested.

18. The apparatus of claim 14 including an inflatable seal carried by at least one of said first and second tool components for applying selected pressure to the package seal of a package under test.

19. The apparatus of claim 14 in which said means for urging the flexible bladder against the gas permeable surface area includes a pressure chamber formed in the first tool component, and means for supplying fluid under pressure into said pressure chamber to thereby urge said flexible bladder to cooperatively engage the gas permeable material to prevent the passage of gas therethrough.

20. The apparatus of claim 17 including a pressure chamber formed in each of said opposing tool components adjacent to said flexible bladders, means for introducing fluid under pressure into each of said pressure chambers to thereby urge the flexible bladders towards one another when a package is placed between said flexible bladders.

21. An apparatus for testing a leak in a gas permeable material associated with a package or container defining an interior sealed space, the apparatus including, a vacuum test chamber of a size to cooperatively receive a package therein defined by opposing first and second tool components having opposing peripheral edges, at least one flexible bladder extending between the opposing tool components of a size to completely cover the gas permeable surface area to be tested, said at least one flexible bladder having a surface defining a plurality of air flow passageways which engages the gas permeable area to be tested, means for creating at least a partial vacuum within the test chamber so as to create a pressure differential between an interior space of a package and the test chamber, and means for monitoring the pressure within the test chamber following the application of at least a partial vacuum.

* * * * *